United States Patent [19]

Lashier et al.

[11] Patent Number: 5,543,375
[45] Date of Patent: Aug. 6, 1996

[54] OLEFIN PRODUCTION

[75] Inventors: Mark E. Lashier; Jeffrey W. Freeman; Ronald D. Knudsen, all of Bartlesville, Okla.

[73] Assignee: Phillips Petroleum Company, Bartlesville, Okla.

[21] Appl. No.: 198,331

[22] Filed: Feb. 18, 1994

[51] Int. Cl.$^6$ .............................. B01J 31/02; B01J 31/34
[52] U.S. Cl. .................... 502/117; 502/104; 585/512
[58] Field of Search .................................. 502/104, 117; 585/512, 522

[56] References Cited

U.S. PATENT DOCUMENTS

| | | | |
|---|---|---|---|
| 4,668,838 | 5/1987 | Briggs | 585/513 |
| 4,716,206 | 12/1987 | Fujita et al. | 526/139 |
| 5,198,563 | 3/1993 | Reagen et al. | 556/57 |
| 5,288,823 | 2/1994 | Reagen et al. | 526/124 |
| 5,382,738 | 1/1995 | Reagan et al. | 585/512 |

OTHER PUBLICATIONS

Briggs, John R.; *Journal Chem. Soc., Chem. Commun.* "The Selective Trimerization of Ethylene to Hex—1—ene", (1989), pp. 674–675.

Grant, Roger et al.; *Grant & Hackh's Chemical Dictionary*, 5th Ed.,(1987) p. 273.

*Primary Examiner*—Ponnathapura Achutamurthy
*Attorney, Agent, or Firm*—Lynda S. Jolly

[57] ABSTRACT

A process is provided to stabilize and/or reactivate an olefin production catalyst system which comprises contacting an olefin production catalyst system, either before or after use, with an aromatic compound.

10 Claims, No Drawings

5,543,375

OLEFIN PRODUCTION

BACKGROUND OF THE INVENTION

This invention relates to olefin production and olefin production catalyst system stabilization.

Olefins, primarily alpha-olefins, have many uses. In addition to uses as specific chemicals, alpha-olefins are used in polymerization processes either as a monomer or a comonomer to prepare polyolefins, or polymers. Unfortunately, during any catalyzed reaction, such as an olefin production process or a polymerization process, catalyst system activity and productivity can decrease. Furthermore, harsher reaction conditions, such as increased temperatures, can increase catalyst productivity and selectivity, but, conversely, can result in shorter catalyst system life, quicker catalyst system decomposition, and/or catalyst system destabilization. Disposal of spent catalyst system can pose environmental problems and continual addition of new catalyst system can be cost prohibitive.

SUMMARY OF THE INVENTION

Accordingly, it is an object of this invention to improve olefin production catalyst system activity and productivity.

It is another object of this invention to provide a process which will effectively stabilize and/or reactivate an olefin production catalyst system.

It is a further object of this invention to provide a process which will enhance olefin production using an improved, or stabilized, olefin production catalyst system.

It is yet another object of this invention to provide a process to increase the thermostability of an olefin production catalyst system.

In accordance with this invention, a process is provided to stabilize, regenerate and/or reactivate an olefin production catalyst system which comprises contacting an olefin production catalyst system, either before or after use, with an aromatic compound.

DETAILED DESCRIPTION OF THE INVENTION

Catalyst Systems

Catalyst systems useful in accordance with this invention comprise a chromium source, a pyrrole-containing compound and a metal alkyl, all of which have been contacted and/or reacted in the presence of an unsaturated hydrocarbon. Optionally, these catalyst systems can be supported on an inorganic oxide support. These catalyst systems are especially useful for the dimerization and trimerization of olefins, such as, for example, ethylene to 1-hexene.

The chromium source can be one or more organic or inorganic compounds, wherein the chromium oxidation state is from 0 to 6. Generally, the chromium source will have a formula of $CrX_n$, wherein X can be the same or different and can be any organic or inorganic radical, and n is an integer from 1 to 6. Exemplary organic radicals can have from about 1 to about 20 carbon atoms per radical, and are selected from the group consisting of alkyl, alkoxy, ester, ketone, and/or amido radicals. The organic radicals can be straight-chained or branched, cyclic or acyclic, aromatic or aliphatic, can be made of mixed aliphatic, aromatic, and/or cycloaliphatic groups. Exemplary inorganic radicals include, but are not limited to halides, sulfates, and/or oxides.

Preferably, the chromium source is a chromium(II)- and/or chromium(III)-containing compound which can yield a catalyst system with improved polymerization activity. Most preferably, the chromium source is a chromium(III) compound because of ease of use, availability, and enhanced catalyst system activity. Exemplary chromium(III) compounds include, but are not limited to, chromium carboxylates, chromium naphthenates, chromium halides, chromium pyrrolides, and/or chromium dionates. Specific exemplary chromium(III) compounds include, but are not limited to, chromium(III) 2,2,6,6,-tetramethylheptanedionate [Cr(TMHD)$_3$], chromium(III) 2-ethylhexanoate [Cr(EH)$_3$ or chromium(III) tris(2-ethylhexanoate)], chromium(III) naphthenate [Cr(Np)$_3$], chromium(III) chloride, chromic bromide, chromic fluoride, chromium(III) acetylacetonate, chromium(III) acetate, chromium(III) butyrate, chromium(III) neopentanoate, chromium(III) laurate, chromium(III) stearate, chromium(III) pyrrolides and/or chromium(III) oxalate.

Specific exemplary chromium(II) compounds include, but are not limited to, chromous bromide, chromous fluoride, chromous chloride, chromium(II) bis(2-ethylhexanoate), chromium(II) acetate, chromium(II) butyrate, chromium(II) neopentanoate, chromium(II) laurate, chromium(II) stearate, chromium(II) oxalate and/or chromium(II) pyrrolides.

The pyrrole-containing compound can be any pyrrole-containing compound, or pyrrolide, that will react with a chromium source to form a chromium pyrrolide complex. As used in this disclosure, the term "pyrrole-containing compound" refers to hydrogen pyrrolide, i.e., pyrrole ($C_4H_5N$), derivatives of hydrogen pyrrolide, substituted pyrrolides, as well as metal pyrrolide complexes. A "pyrrolide" is defined as a compound comprising a 5-membered, nitrogen-containing heterocycle, such as for example, pyrrole, derivatives of pyrrole, and mixtures thereof. Broadly, the pyrrole-containing compound can be pyrrole and/or any heteroleptic or homoleptic metal complex or salt, containing a pyrrolide radical, or ligand. The pyrrole-containing compound can be either affirmatively added to the reaction, or generated in-situ.

Generally, the pyrrole-containing compound will have from about 4 to about 20 carbon atoms per molecule. Exemplary pyrrolides are selected from the group consisting of hydrogen pyrrolide (pyrrole), lithium pyrrolide, sodium pyrrolide, potassium pyrrolide, cesium pyrrolide, and/or the salts of substituted pyrrolides, because of high reactivity and activity with the other reactants. Examples of substituted pyrrolides include, but are not limited to, pyrrole-2-carboxylic acid, 2-acetylpyrrole, pyrrole-2-carboxaldehyde, tetrahydroindole, 2,5-dimethylpyrrole, 2,4-dimethyl-3-ethylpyrrole, 3-acetyl-2,4-dimethylpyrrole, ethyl-2,4-dimethyl-5-(ethoxycarbonyl)-3-pyrroleproprionate, ethyl-3,5-dimethyl-2-pyrrolecarboxylate, and mixtures thereof. When the pyrrole-containing compound contains chromium, the resultant chromium compound can be called a chromium pyrrolide.

The most preferred pyrrole-containing compounds used in a trimerization catalyst system are selected from the group consisting of hydrogen pyrrolide, i.e., pyrrole ($C_4H_5N$), 2,5-dimethylpyrrole and/or chromium pyrrolides because of enhanced trimerization activity. Optionally, for ease of use, a chromium pyrrolide can provide both the chromium source and the pyrrole-containing compound. As used in this disclosure, when a chromium pyrrolide is used to form a catalyst system, a chromium pyrrolide is considered to provide both the chromium source and the pyrrole-containing compound. While all pyrrole-containing compounds can produce catalyst systems with high activity and productivity, use of pyrrole and/or 2,5-dimethylpyrrole can produce a catalyst system with enhanced activity and selectivity to a desired product.

The metal alkyl can be any heteroleptic or homoleptic metal alkyl compound. One or more metal alkyls can be used. The alkyl ligand(s) on the metal can be aliphatic and/or aromatic. Preferably, the alkyl ligand(s) are any saturated or unsaturated aliphatic radical. The metal alkyl can have any number of carbon atoms. However, due to commercial availability and ease of use, the metal alkyl will usually comprise less than about 70 carbon atoms per metal alkyl molecule and preferably less than about 20 carbon atoms per molecule. Exemplary metal alkyls include, but are not limited to, alkylaluminum compounds, alkylboron compounds, alkylmagnesium compounds, alkylzinc compounds and/or alkyl lithium compounds. Exemplary metal alkyls include, but are not limited to, n-butyl lithium, s-butyllithium, t-butyllithium, diethylmagnesium, diethylzinc, triethylaluminum, trimethylaluminum, triisobutylalumium, and mixtures thereof.

Preferably, the metal alkyl is selected from the group consisting of non-hydrolyzed, i.e., not pre-contacted with water, alkylaluminum compounds, derivatives of alkylaluminum compounds, halogenated alkylaluminum compounds, and mixtures thereof for improved product selectivity, as well as improved catalyst system reactivity, activity, and/or productivity. The use of hydrolyzed metal alkyls can result is decreased olefin, i.e., liquids, production and increased polymer, i.e., solids, production.

Most preferably, the metal alkyl is a non-hydrolyzed alkylaluminum compound, expressed by the general formulae $AlR_3$, $AlR_2X$, $AlRX_2$, $AlR_2OR$, $AlRXOR$, and/or $Al_2R_3X_3$, wherein R is an alkyl group and X is a halogen atom. Exemplary compounds include, but are not limited to, triethylaluminum, tripropylaluminum, tributylaluminum, diethylaluminum chloride, diethylaluminum bromide, diethylaluminum ethoxide, diethylaluminum phenoxide, ethylaluminum dichloride, ethylaluminum sesquichloride, and mixtures thereof for best catalyst system activity and product selectivity. The most preferred alkylaluminum compound is triethylaluminum, for best results in catalyst system activity and product selectivity.

Usually, contacting and/or reacting of the chromium source, pyrrole-containing compound and a metal alkyl is done in an unsaturated hydrocarbon. The unsaturated hydrocarbon can be any aromatic or aliphatic hydrocarbon, in a gas, liquid or solid state. Preferably, to effect through contacting of the chromium source, pyrrole-containing compound, and metal alkyl, the unsaturated hydrocarbon will be in a liquid state. The unsaturated hydrocarbon can have any number of carbon atoms per molecule. Usually, the unsaturated hydrocarbon will comprise less than about 70 carbon atoms per molecule, and preferably, less than about 20 carbon atoms per molecule, due to commercial availability and ease of use. Exemplary unsaturated, aliphatic hydrocarbon compounds include, but are not limited to, ethylene, 1-hexene, 1,3-butadiene, and mixtures thereof. The most preferred unsaturated aliphatic hydrocarbon compound is 1-hexene, because of elimination of catalyst system preparation steps and 1-hexene can be a reaction product. Exemplary unsaturated aromatic hydrocarbons include, but are not limited to, toluene, benzene, xylene, mesitylene, hexamethylbenzene, and mixtures thereof. Unsaturated, aromatic hydrocarbons are preferred in order to improve catalyst system stability, as well as produce a highly active and selective catalyst system. The most preferred unsaturated aromatic hydrocarbon is toluene.

It should be recognized, however, that the reaction mixture comprising a chromium source, pyrrole-containing compound, metal alkyl and unsaturated hydrocarbon can contain additional components which do not adversely affect and can enhance the resultant catalyst system.

Catalyst System Stabilization

Even through the catalyst system preferably can be produced in the presence of an unsaturated hydrocarbon, in accordance with this invention, additional, beneficial catalyst system stabilization can be achieved, by contacting the catalyst system with an aromatic compound.

The contacting of the catalyst system and aromatic compound can occur at anytime prior to contacting the catalyst system with one of the reactants, such as, for example, an olefin like ethylene, and prior to the introduction of heat to the catalyst system. Therefor, the aromatic compound and the catalyst system preferably can be precontacted outside of the reactor, or contacted in-situ in the reactor. Contacting of the aromatic compound and catalyst system can occur under any conditions sufficient to stabilize the catalyst system in the presence of heat. Generally, contacting temperatures can be within a range of about −50° to about 70° C., preferably within a range of about 10° to about 70° C. Most preferably, for ease of use and safety, contacting can occur at a temperature within a range of 20° to 30° C. Generally, contacting times will be less than about 1 hour, and preferably for a time within a range of 0.01 seconds to about 10 minutes. Most preferably, the contacting time can be within a range of 0.1 seconds to 30 seconds. Additional contact times do not improve catalyst stability, and shorter contact times can be insufficient to allow complete contacting of the aromatic compound and catalyst system and, therefor, insufficient stabilization of the catalyst system. Any pressure which allows thorough contacting of the aromatic compound and catalyst system can be used. Most preferably, any pressure which can maintain the aromatic compound and catalyst system in liquid form, in order to ensure a thorough contacting, can be used. Most preferably, the contacting is done under a dry, inert atmosphere, so as to not alter the catalyst system.

Any aromatic compound can be used which can stabilize the catalyst system in the presence of heat. Generally, the aromatic compound will have greater than or equal to about 6 carbon atoms per molecule and can have any substituents attached to the organic ring compound. Preferably, the aromatic compound will have from six to 50 carbon atoms per molecule in order to enable a thorough contacting of the aromatic compound with the catalyst system. The aromatic compound can act as its own solvent or can be soluble in another solvent or carrier. Aromatic compounds with 6 to 50 carbon atoms per molecule are generally more soluble in the reactor medium at reaction conditions and therefor are easily maintained as a liquid.

Generally, the amount of aromatic compound added to the reactor can be up to about 15 weight percent, based on the amount of solvent in the reactor, and preferably within a range of about 0.1 to about 10 weight percent. Most preferably, the amount of aromatic compound contacted with the catalyst system is within a range of 0.5 to 5 weight percent, based on the volume of solvent in the reactor. Too much aromatic compound can inhibit catalyst system activity and insufficient aromatic compound cannot act as a stabilizer to the catalyst system. Expressed in different terms, the moles of aromatic compound per mole of active chromium compound in the catalyst system can be up to about 6,000, preferably within a range of about 550 to about 3,000 moles of aromatic compound per mole of active chromium in the catalyst system. Most preferably, an amount within a range of 400 to 1,000 can be used for the reasons given above.

Reactants

Trimerization, as used in this disclosure, is defined as the combination of any two, three, or more olefins, wherein the number of olefin, i.e., carbon-carbon double bonds is reduced by two. Reactants applicable for use in the trimerization process of this invention are olefinic compounds which can a) self-react, i.e., trimerize, to give useful products such as, for example, the self reaction of ethylene can give 1-hexene and the self-reaction of 1,3-butadiene can give 1,5-cyclooctadiene; and/or b) olefinic compounds which can react with other olefinic compounds, i.e., co-trimerize, to give useful products such as, for example, co-trimerization of ethylene plus hexene can give 1-decene and/or 1-tetradecene, co-trimerization of ethylene and 1-butene can give 1-octene, co-trimerization of 1-decene and ethylene can give 1-tetradecene and/or 1-docosene. For example, the number of olefin bonds in the combination of three ethylene units is reduced by two, to one olefin bond, in 1-hexene. In another example, the number of olefin bonds in the combination of two 1,3-butadiene units, is reduced by two, to two olefin bonds in 1,5-cyclooctadiene. As used herein, the term "trimerization" is intended to include dimerization of diolefins, as well as "co-trimerization", both as defined above.

Suitable trimerizable olefin compounds are those compounds having from about 2 to about 30 carbon atoms per molecule and having at least one olefinic double bond. Exemplary mono-1-olefin compounds include, but are not limited to acyclic and cyclic olefins such as, for example, ethylene, propylene, 1-butene, 2-butene, isobutylene, 1-pentene, 2-pentene, 1-hexene, 2-hexene, 3-hexene, 1-heptene, 2-heptene, 3-heptene, the four normal octenes, the four normal nonenes, and mixtures of any two or more thereof. Exemplary diolefin compounds include, but are not limited to, 1,3-butadiene, 1,4-pentadiene, and 1,5-hexadiene. If branched and/or cyclic olefins are used as reactants, while not wishing to be bound by theory, it is believed that steric hindrance could hinder the trimerization process. Therefore, the branched and/or cyclic portion(s) of the olefin preferably should be distant from the carbon-carbon double bond.

Catalyst systems produced in accordance with this invention preferably are employed as trimerization catalyst systems.

Reaction Conditions

The reaction products, i.e., olefin trimers as defined in this specification, can be prepared from the catalyst systems of this invention by solution reaction, slurry reaction, and/or gas phase reaction techniques using conventional equipment and contacting processes. Contacting of the monomer or monomers with a catalyst system can be effected by any manner known in the art. One convenient method is to suspend the catalyst system in an organic medium and to agitate the mixture to maintain the catalyst system in solution throughout the trimerization process. Other known contacting methods can be also be employed.

Reaction temperatures and pressures can be any temperature and pressure which can trimerize the olefin reactants. Generally, reaction temperatures are within a range of about 0° to about 250° C. Preferably, reaction temperatures within a range of about 60° to about 200° C. and most preferably, within a range of 80° to 150° C. are employed. Generally, reaction pressures are within a range of about atmospheric to about 2500 psig. Preferably, reaction pressures within a range of about atmospheric to about 1000 psi and most preferably, within a range of 300 to 700 psi are employed.

Too low of a reaction temperature can produce too much undesirable insoluble product, such as, for example, polymer, and too high of a temperature can cause decomposition of the catalyst system and reaction products. Too low of a reaction pressure can result in low catalyst system activity.

Optionally, hydrogen can be added to the reactor to accelerate the reaction and/or increase catalyst system activity.

Catalyst systems of this invention are particularly suitable for use in trimerization processes. The slurry process is generally carried out in an inert diluent (medium), such as a paraffin, cycloparaffin, or aromatic hydrocarbon. Exemplary reactor diluents include, but are not limited to, isobutane and cyclohexane. Isobutane can be used to improve process compatibility with other known olefin production processes. However, a homogeneous trimerization catalyst system is more soluble in cyclohexane. Therefore, a preferred diluent for a homogeneous catalyzed trimerization process is cyclohexane. When the reactant is predominately ethylene, a temperature in the range of about 0° to about 300° C. generally can be used. Preferably, when the reactant is predominately ethylene, a temperature in the range of about 60° to about 110° C. is employed.

Products

The olefinic products of this invention have established utility in a wide variety of applications, such as, for example, as monomers for use in the preparation of homopolymers, copolymers, and/or terpolymers.

The further understanding of the present invention and its advantages will be provided by reference to the following examples.

EXAMPLES

Example 1

An exemplary catalyst system was prepared under an inert atmosphere (nitrogen) using chromium(III) 2-ethylhexanoate (21.3 mmol Cr), 2,5-dimethylpyrrole (63.8 mmol), ethylaluminum dichloride (85.1 mmol) and triethylaluminum (319 mmol) as follows: Chromium (III) 2-ethylhexanoate was dissolved in 100 mL anhydrous toluene and 2,5-dimethylpyrrole added to the resulting dark green solution. In a separate container, ethylaluminum dichloride and triethylaluminum were mixed together. Then, the aluminum alkyl solution was poured slowly into the chromium/pyrrole solution. The resulting dark yellow-brown solution was stirred for 5 minutes and then the solvent removed in vacuo. The remaining oily liquid was diluted to 150 mL with cyclohexane and allowed to set overnight, under nitrogen, at room temperature and pressure. The solution then was filtered to remove a black precipitate from the filtrate, which contained the catalyst system, and was diluted to a volume of 250 mL using cyclohexane.

The catalyst system solution and solvent (dodecane) were placed in a 1-liter flask equipped with a nitrogen inlet and a stir bar, under an inert nitrogen atmosphere, and the reactor was brought to the desired temperature.

Ethylene was added until the reactor pressure reached 700 psig; and then ethylene was fed on demand for a specific time period. Ethylene flow as then stopped and the reactor was slowly vented through a cooled, copper coil. Condensed liquids in the coil and reactor were collected and analyzed. A slight nitrogen purge was used to aid in removal of volatile product(s) once the reactor pressure had dropped to one atmosphere.

The reactor was then resealed and ethylene was added again until the pressure reached 700 psi; ethylene was fed on demand. The reactor was vented again, as described earlier. Reactor resealing, ethylene pressurization, reactor venting, and sample collection were repeated two or three more times.

Run 101 had 10 mg chromium (Cr) charged and Runs 102–104 had 5 mg Cr charged as part of the catalyst system.

The results of four Runs wherein no additional aromatic compounds were added to stabilize the catalyst system are given below in Table 1. The data in Tables 1 and 2 are a summation, or running total, for all sample fractions collected. The column headers in the Tables, such as $C_4^=$ and $C_6^=$, stand for all of one type of olefin collected, such as all butenes and all hexenes, unless otherwise indicated. The balance of products collected, to total 100 weight percent, were olefins with more than 10 carbon atoms per molecule.

catalyst system activity decreases over time at constant reactor conditions.

Example 2

Runs 201–204 used identical catalyst systems, as described in Runs 101–104, and olefin production reaction conditions similar to those in Table 1. However, an aromatic compound added to the reactor with the catalyst system in Runs 201–204. Reactor temperature in Runs 201–204 was 140° C. and 5 mg of Cr as part of the catalyst system were charged. In Runs 201 and 202, 15 mL of toluene were added to the reactor along with the olefin production catalyst system and in Runs 203 and 204, 15 mL of freshly distilled n-butylbenzene were added to the reactor along with the catalyst system. The results of Runs 201–204 are given below in Table 2.

TABLE 1

| Run[a] | Reactor Temp, °C. | Total Time, mins | Productivity, g olefins/ g Cr/hr | Total Olefins Collected, g | Total Polymer Collected, g | $C_4^=$, wt % | $C_6^=$, Total wt % | 1-$C_6^=$, wt %[b] | $C_8^=$, Wt % | $C_{10}^=$, wt % |
|---|---|---|---|---|---|---|---|---|---|---|
| 101-A | 90 | 60 | 22,700 | 226.6 | — | 0.03 | 96.0 | 99.2 | 0.2 | 2.9 |
| 101-B | 90 | 120 | 13,400 | 268.6 | — | 0.01 | 92.8 | 99.2 | 0.8 | 5.7 |
| 101-C | 90 | 180 | 9,700 | 290.1 | — | 0.02 | 87.1 | 99.2 | 1.4 | 10.7 |
| 101-D | 90 | 240 | 7,400 | 295.5 | 1.26 | <0.01 | 60.5 | 99.3 | 2.9 | 35.7 |
| 102-A | 90 | 30 | 38,000 | 95.0 | — | <0.01 | 98.7 | 99.7 | 0.2 | 0.8 |
| 102-B | 90 | 60 | 27,400 | 137.1 | — | 0.01 | 98.9 | 99.7 | 0.2 | 0.6 |
| 102-C | 90 | 120 | 17,800 | 177.9 | — | 0.02 | 98.7 | 99.7 | 0.3 | 0.8 |
| 102-D | 90 | 180 | 14,100 | 210.8 | — | 0.02 | 98.3 | 99.7 | 0.4 | 1.0 |
| 102-E | | reactor liquid | — | 265.1 | 2.47 | <0.01 | 78.4 | 99.7 | 1.7 | 19.0 |
| 103-A | 115 | 30 | 15,800 | 39.4 | — | 0.04 | 98.2 | 99.2 | 0.1 | 0.9 |
| 103-B | 115 | 60 | 14,500 | 72.4 | — | 0.03 | 97.1 | 99.3 | 0.3 | 1.8 |
| 103-C | 115 | 120 | 8,800 | 87.9 | — | 0.02 | 94.4 | 99.3 | 0.6 | 4.3 |
| 103-D | 115 | 180 | 6,600 | 98.9 | — | 0.03 | 95.5 | 99.3 | 0.6 | 3.2 |
| 103-E | 115 | reactor liquid | — | 129.2 | 1.19 | <0.01 | 73.9 | 99.4 | 1.3 | 23.8 |
| 104-A | 140 | 30 | 7,500 | 18.8 | — | 0.34 | 98.4 | 99.3 | 0.2 | 0.3 |
| 104-E | 140 | 60 | 8,300 | 41.7 | — | 0.15 | 98.2 | 99.3 | 0.2 | 0.6 |
| 104-C | 140 | 120 | 6,000 | 60.0 | — | 0.2 | 97.9 | 99.2 | 0.3 | 0.9 |
| 104-D | 140 | 180 | 5,600 | 83.6 | — | 0.1 | 97.7 | 99.1 | 0.3 | 1.0 |
| 104-E | 140 | reactor liquid | — | 108.6 | 3.20 | <0.01 | 82.0 | 99.0 | 1.3 | 15.9 |

[a]Run 101 had 10.0 mg catalyst system charged; Runs 102–104 had 5.0 mg catalyst system charged.
[b]Weight percent of 1-$C_6^=$ (1-hexene) is based on the total weight of all hexenes collected.

The data in Table 1 show that as reactor temperature is increased, i.e., from 90° C. to 140° C., catalyst system activity decreases. The data in Table 1 also show that

TABLE 2

| Run | Total Time, mins | Productivity, g olefins/ g Cr/hr | Total Olefins Collected, g | Total Polymer Collected, g | $C_4^=$, wt % | $C_6^=$ Total, wt % | 1-$C_6^=$, wt %[b] | $C_8^=$, wt % | $C_{10}^=$, wt % |
|---|---|---|---|---|---|---|---|---|---|
| 201-A | 30 | 26,400 | 65.9 | — | 0.08 | 98.3 | 99.3 | 0.1 | 0.8 |
| 201-B | 60 | 23,300 | 116.6 | — | 0.1 | 97.8 | 99.3 | 0.2 | 1.2 |
| 201-C | 120 | 15,400 | 154.1 | — | 0.1 | 97.0 | 99.3 | 0.3 | 1.9 |

TABLE 2-continued

| Run | Total Time, mins | Productivity, g olefins/ g Cr/hr | Total Olefins Collected, g | Total Polymer Collected, g | $C_4^=$, wt % | $C_6^=$ Total, wt % | $1\text{-}C_6^=$, wt %[b] | $C_8^=$, wt % | $C_{10}^=$, wt % |
|---|---|---|---|---|---|---|---|---|---|
| 201-D | 180 | 12,200 | 182.9 | — | 0.06 | 95.2 | 99.3 | 0.6 | 3.4 |
| 201-E | reactor liquid | — | 214.4 | 0.83 | <0.01 | 66.2 | 99.3 | 1.7 | 30.3 |
| 202-A | 30 | 23,700 | 59.2 | — | 0.1 | 98.6 | 99.4 | 0.09 | 0.6 |
| 202-B | 60 | 19,200 | 96.0 | — | 0.07 | 97.9 | 99.4 | 0.2 | 1.2 |
| 202-C | 120 | 13,100 | 130.7 | — | 0.1 | 97.4 | 99.4 | 0.3 | 1.6 |
| 202-D | 180 | 10,200 | 152.4 | — | 0.08 | 96.6 | 99.4 | 0.4 | 2.3 |
| 202-E | reactor liquid | — | 175.6 | 0.87 | <0.01 | 71.9 | 99.4 | 1.4 | 25.6 |
| 203-A | 30 | 33,600 | 84.0 | — | 0.2 | 97.7 | 99.1 | 0.1 | 1.0 |
| 203-B | 60 | 32,800 | 163.9 | — | 0.2 | 96.6 | 99.0 | 0.3 | 1.9 |
| 203-C | 120 | 22,800 | 226.6 | — | 0.2 | 95.8 | 99.0 | 0.5 | 2.5 |
| 203-D | 180 | 18,000 | 269.7 | — | 0.1 | 93.5 | 99.0 | 0.9 | 4.5 |
| 203-E | reactor liquid | — | 307.2 | 2.38 | <0.01 | 44.8 | 99.0 | 2.1 | 39.3 |
| 204-A | 30 | 25,900 | 64.7 | — | 0.2 | 97.8 | 99.2 | 0.2 | 1.0 |
| 204-B | 60 | 25,300 | 126.3 | — | 0.2 | 97.0 | 99.1 | 0.3 | 1.6 |
| 204-C | 120 | 18,000 | 185.1 | — | 0.3 | 96.2 | 99.0 | 0.4 | 2.1 |
| 204-D | 180 | 15,700 | 239.8 | — | 0.3 | 94.9 | 99.0 | 0.7 | 3.1 |
| 204-E | reactor liquid | — | 303.2 | 0.37 | <0.01 | 59.3 | 98.7 | 2.1 | 28.5 |

[a]Weight percent of $1\text{-}C_6^=$ (1-hexene) is based on the total weight of all hexenes collected.

As can be seen from the data in Table 2, the addition of an aromatic compound to the catalyst system significantly increases catalyst system activity and total grams of olefins collected, without sacrificing selectivity to 1-hexene.

While this invention has been described in detail for the purpose of illustration, it is not to be construed as limited thereby but is intended to cover all changes and modifications within the spirit and scope thereof.

That which is claimed is:

1. A process to stabilize an olefin production catalyst system comprising wherein said catalyst system comprises a chromium compound, a pyrrole-containing compound and a metal alkyl, wherein said process comprises the steps of:
   reacting the three catalyst system components in the presence of an unsaturated hydrocarbon; and
   contacting and stabilizing said catalyst system with a mononuclear aromatic compound selected from the group consisting of toluene, benzene, xylene, mesitylene, hexamethylbenzene, n-butylbenzene, and mixtures thereof;
   wherein said catalyst system and mononuclear aromatic compound are contacted prior to contacting the catalyst system with a reactant at a temperature within a range of about −50° to about 70° C., for a time of less than 1 hour, and under a dry, inert atmosphere.

2. A process according to claim 1 wherein said chromium source is selected from the group consisting of chromium(II)-containing compound, a chromium(III)-containing compound, and mixtures thereof.

3. A process according to claim 2 wherein said chromium source is a chromium(III)-containing compound selected from the group selected from the group consisting of chromium carboxylates, chromium naphthenates, chromium halides, chromium pyrrolides, chromium dionates and mixtures of two or more thereof.

4. A process according to claim 3 wherein said chromium source is selected from the group consisting of chromium(III) 2,2,6,6,-tetramethylheptanedionate, chromium(III) 2-ethylhexanoate, chromium(III) naphthenate, chromium(III) chloride, chromic bromide, chromic fluoride, chromium(III) acetylacetonate, chromium(III) acetate, chromium(III) butyrate, chromium(III) neopentanoate, chromium(III) laurate, chromium(III) stearate, chromium (III) pyrrolides, chromium(III) oxalate, and mixtures of two or more thereof.

5. A process according to claim 1 wherein said metal alkyl is a non-hydrolyzed metal alkyl and is selected from the group consisting of alkyl aluminum compounds, alkyl boron compounds, alkyl magnesium compounds, alkyl zinc compounds, alkyl lithium compounds, and mixtures of two or more thereof.

6. A process according to claim 5 wherein said non-hydrolyzed metal alkyl is an alkyl aluminum compound.

7. A process according to claim 6 wherein said alkyl aluminum compound is triethyl aluminum.

8. A process according to claim 1 wherein said pyrrole-containing compound is selected from the group consisting of pyrrole, derivatives of pyrrole, alkali metal pyrrolides, salts of alkali metal pyrrolides, and mixtures thereof.

9. A process according to claim 8 wherein said pyrrole-containing compound is selected from the group consisting of hydrogen pyrrolide, 2,5-dimethylpyrrole, and mixtures thereof.

10. A process according to claim 1 wherein contacting temperature is within a range of 20° to 30° C., and said contacting is carried out for a time of 0.1 seconds to 30 seconds, under a dry, inert atmosphere.

\* \* \* \* \*